June 19, 1951 B. R. WRIGHT 2,557,332
LINE PURIFIER

Filed July 7, 1949 2 Sheets-Sheet 1

INVENTOR.
BRUCE R. WRIGHT
BY
ATTORNEYS.

INVENTOR.
BRUCE R. WRIGHT
ATTORNEYS.

Patented June 19, 1951

2,557,332

UNITED STATES PATENT OFFICE 2,557,332

LINE PURIFIER

Bruce R. Wright, Cleveland, Ohio, assignor to Centrifix Corporation, Cleveland, Ohio, a corporation of Ohio Application July 7, 1949, Serial No. 103,375

2 Claims. (Cl. 183—81)

This invention relates to a purifier for a fluid line and more particularly relates to such a line purifier which is especially adaptable for use in a steam line.

The line purifier in accordance with this invention provides means which afford positive protection to an engine whistle or the like in a steam line from damage incident to the formation of slugs of water in the line. At the same time, it performs an additional function by acting as a strainer, thus preventing dirt, scale or sediment such as is commonly found in steam lines from reaching operating equipment in the steam line.

It is an object of this invention to provide a line purifier which is adaptable for use in a steam line.

A further object of this invention is to provide a line purifier which is adaptable for use in a steam line and which will protect equipment in the steam line from damage due to both slugs of water and dirt, scale, sediment or the like.

These and other objects of this invention will become apparent on reading the description in conjunction with the accompanying drawings, in which.

Figure 1:
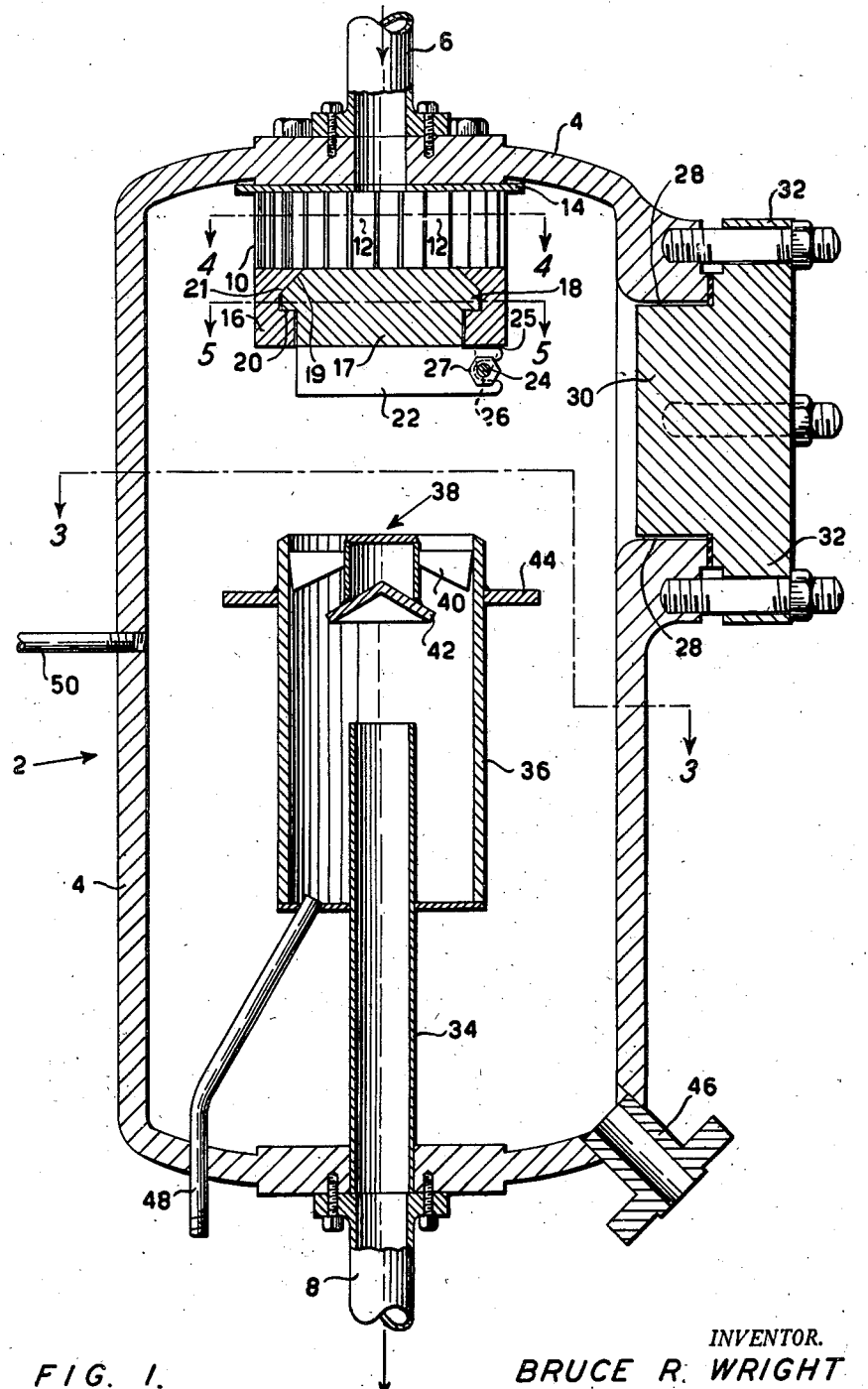
Figure 1 is a vertical section through a line purifier in accordance with this invention.
Figure 2:
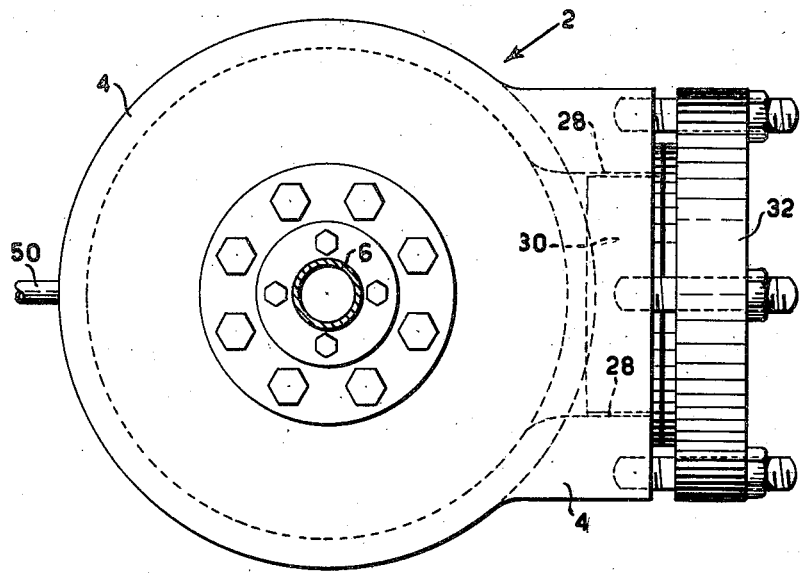
Figure 2 is a top plan view of the device of Figure 1.

Referring now to Figure 1, a line purifier 2 in accordance with this invention has a casing 4. Steam lines 6 and 8 are flanged to the top and bottom of the casing, respectively, line 6 leading from the source of steam supply and line 8 leading to equipment in the steam line, as, for example, an engine or a whistle.

A tuyère 10 is secured within casing 4 below steam line 6. Tuyère 10 is of the barrel type and comprises a series of tangentially and vertically arranged blades 12. The blades 12 are secured between a plate 14 and a base 16.

Figure 4:
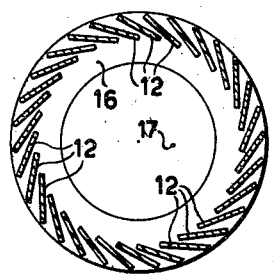
Figure 4 is a section taken on the plane indicated by the line 4—4 in Figure 1.
Figure 3:
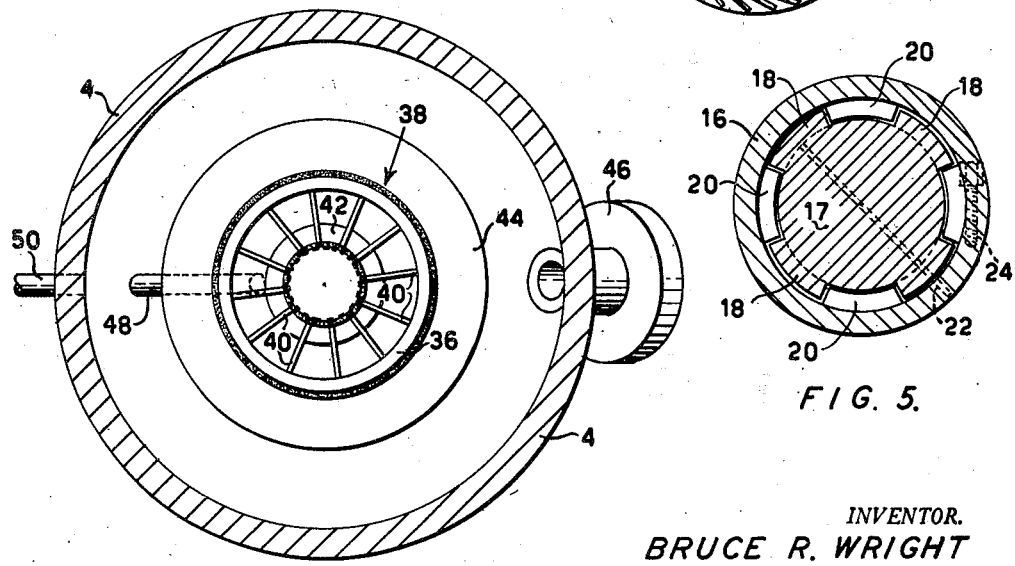
Figure 3 is a section taken on the planes indicated by the line 3—3 in Figure 1.
Figure 5:
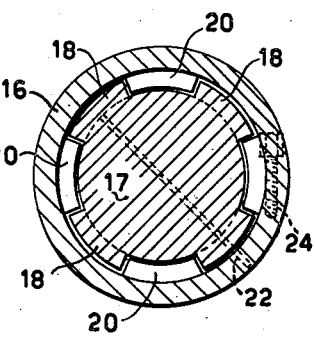
Figure 5 is a section taken on the plane indicated by the line 5—5 in Figure 1.

As shown more clearly in Figure 4, the blades 12 have their inner ends spaced closely to their next adjacent blade so that the passages formed between the blades are constricted. The close arrangement of the blades results, in effect, in the formation of a screen through which dirt, scale and other unwanted substances cannot pass.

It will be apparent, of course, that the spacing between the blades can be varied depending upon what size of particle it is desired to arrest.

Blades 12 perform an additional function. They cause the steam and water passing out through the tuyère 10 to be directed outwardly toward the wall of the casing with a centrifugal effect. This results in any water being thrown against the wall where it coalesces and flows to the bottom of the casing.

The tuyère base 16 carries a removable plug 17 which has a chamfered face 19 abutting against chamfered face 21 of the base. Plug 17 has an interrupted flange 18 which coacts with an interrupted flange 20 in base 16. When plug 17 is in the secured position, interrupted flanges 18 are turned so as to rest on interrupted flanges 20. In order to withdraw the plug 17, it is turned until the interrupted flange 18 can pass through the openings in interrupted flange 20.

Plug 17 is manipulatable by means of a handle bar 22 on the bottom thereof. A bolt 24 which is secured to base 16 by means of a depending bracket 25 passes through cut-out portion 26 in handle bar 22 when plug 17 is in the closed position and carries a nut 27. Handle bar 22 is secured between nut 27 and bracket 25 when it is desired to secure plug 17 in the closed position.

A hand hole 28 in the wall of casing 4 has a removable plug 30. Plug 30 has a flange 32 which is bolted to casing 4.

By the successive removal of plugs 30 and 17, access to the interior of the tuyère 10 is obtained. This provides ready means for cleaning out the scale, dirt and the like which has been screened out of the passing fluids by the blades 12.

Any scale or dirt which passes through blades 12 is carried by centrifugal force to the casing wall and carried to the bottom of the casing by gravity.

Referring again to Figure 1, a pipe 34 is connected to line 8 and leads upwardly in the interior of casing 4. The pipe 34 extends upwardly into casing 36 and supports this casing. A radial tuyère 38 is located within the upper end of casing 36. Tuyère 38 is similar to that disclosed by U. S. Patent No. 1,896,896 and comprises radial blades 40 which may, for example, be arranged at an angle of about 48°. Below blades 40, a conical shaped baffle 42 is mounted. A flange 44 is located around the upper exterior wall of casing 36. Drainage from the bottom casing 4 is provided by drain outlet 46 while drainage from the bottom of casing 36 is provided by line 48 which passes through the bottom of casing 4. Casing 4 is vented by a vent line 50 located intermediate the top and bottom of casing 4.

It will be apparent that the above described embodiment of this invention is merely illustrative and that it is desired to be limited only as set forth in the following claims.

What is claimed is:

1. In a purifier for a steam line, a casing, an inlet for steam at the upper end of the casing, a tuyère secured within said casing to the upper portion thereof and having its inner portion in communication with said inlet for steam, said tuyère having a base and radially and vertical disposed blades, said blades being spaced to entrap solid particles of a predetermined size and being adapted to discharge fluid passing therethrough with a whirling action, a plug in said base and connected thereto by an interrupted flange joint, said plug having the edges of its upper face chamfered and adapted to abut against chamfered faces in the base, a handle bar on the bottom of the plug for manipulating the plug, a stud secured to a bracket depending from the base and adapted to pass through an opening in the handle bar whereby the handle bar may be secured between the bracket and a nut on the stud in order to secure the plug in the closed position and conduit means for exhausting steam from within the casing and having an intake located substantially centrally within the casing.

2. In a purifier for a steam line, a casing, an inlet for steam at the upper end of the casing, a tuyère secured within said casing to the upper portion thereof and having its inner portion in communication with said inlet for steam, said tuyère having a base and vertically disposed blades, said blades being tangential to a circle defined by the inner edges thereof and being spaced to entrap solid particles of a predetermined size and being adapted to discharge fluid passing therethrough with a whirling action, a plug in said base and connected thereto by an interrupted joint, said plug having the edges of its upper face chamfered and adapted to abut against chamfered faces in the base, means for manipulating the plug, and means for locking the plug in the closed position.

BRUCE R. WRIGHT.

REFERENCES CITED

The following references are of record in the file of this patent:

UNITED STATES PATENTS

| Number | Name | Date |
|---|---|---|
| 1,539,481 | Hawley | May 26, 1925 |
| 1,684,021 | Hawley | Sept. 11, 1928 |
| 2,004,467 | Hawley | June 11, 1935 |
| 2,136,476 | Thomas | Nov. 15, 1938 |